(12) United States Patent
Kang et al.

(10) Patent No.: US 10,268,885 B2
(45) Date of Patent: Apr. 23, 2019

(54) EXTRACTING TRUE COLOR FROM A COLOR AND INFRARED SENSOR

(71) Applicant: Microsoft Technology Licensing, LLC, Redmond, WA (US)

(72) Inventors: Sing Bing Kang, Redmond, WA (US); Adam G. Kirk, Renton, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 202 days.

(21) Appl. No.: 13/915,622

(22) Filed: Jun. 11, 2013

(65) Prior Publication Data

US 2014/0307098 A1 Oct. 16, 2014

Related U.S. Application Data

(60) Provisional application No. 61/812,232, filed on Apr. 15, 2013.

(51) Int. Cl.
*H04N 5/235* (2006.01)
*H04N 9/04* (2006.01)
(Continued)

(52) U.S. Cl.
CPC .......... *G06K 9/00536* (2013.01); *B29C 64/00* (2017.08); *B29C 64/386* (2017.08); *G01B 11/22* (2013.01); *G01B 11/25* (2013.01); *G01B 11/2513* (2013.01); *G01B 11/2527* (2013.01); *G01B 11/2545* (2013.01); *G02B 5/1895* (2013.01); *G02B 27/4205* (2013.01); *G02B 27/44* (2013.01); *G06F 3/0653* (2013.01);

*G06F 3/0659* (2013.01); *G06F 3/0683* (2013.01); *G06F 9/3004* (2013.01);
(Continued)

(58) Field of Classification Search
CPC ........ H04N 5/235; H04N 9/045; H04N 5/232; H04N 5/2354; H04N 9/735
See application file for complete search history.

(56) References Cited

U.S. PATENT DOCUMENTS 3,938,102 A   2/1976   Morrin et al.
5,351,152 A   9/1994   Kuo et al.
(Continued)

FOREIGN PATENT DOCUMENTS

CN   1244008 A   2/2000
CN   1414412 A   4/2003
(Continued)

OTHER PUBLICATIONS

"International Preliminary Report on Patentability Issued in PCT Patent Application No. PCT/US2014/033909", dated Jun. 29, 2015, 17 Pages.
(Continued)

*Primary Examiner* — Matthew Salvucci (57) ABSTRACT

The subject disclosure is directed towards color correcting for infrared (IR) components that are detected in the R, G, B parts of a sensor photosite. A calibration process determines true R, G, B based upon obtaining or estimating IR components in each photosite, such as by filtering techniques and/or using different IR lighting conditions. A set of tables or curves obtained via offline calibration model the correction data needed for online correction of an image.

20 Claims, 6 Drawing Sheets

(51) Int. Cl.
| | |
|---|---|
| H04N 9/73 | (2006.01) |
| G06K 9/00 | (2006.01) |
| H04N 5/33 | (2006.01) |
| G06K 9/62 | (2006.01) |
| G06F 11/30 | (2006.01) |
| G06F 3/06 | (2006.01) |
| G06F 9/30 | (2018.01) |
| G06F 12/02 | (2006.01) |
| G06F 12/00 | (2006.01) |
| B29C 64/386 | (2017.01) |
| H04N 13/128 | (2018.01) |
| H04N 13/25 | (2018.01) |
| H04N 13/254 | (2018.01) |
| H04N 13/271 | (2018.01) |
| G02B 27/42 | (2006.01) |
| G02B 5/18 | (2006.01) |
| G02B 27/44 | (2006.01) |
| H04N 5/225 | (2006.01) |
| H04N 17/00 | (2006.01) |
| G01B 11/25 | (2006.01) |
| G01B 11/22 | (2006.01) |
| G06T 1/60 | (2006.01) |
| G06T 7/00 | (2017.01) |
| G06T 7/586 | (2017.01) |
| B29C 64/00 | (2017.01) |
| H04N 13/239 | (2018.01) |
| H04N 13/00 | (2018.01) |
| A63F 13/213 | (2014.01) |

(52) U.S. Cl.
CPC ...... *G06F 9/30043* (2013.01); *G06F 9/30127* (2013.01); *G06F 11/3024* (2013.01); *G06F 12/00* (2013.01); *G06F 12/02* (2013.01); *G06F 12/0207* (2013.01); *G06F 12/0292* (2013.01); *G06K 9/0063* (2013.01); *G06K 9/00201* (2013.01); *G06K 9/62* (2013.01); *G06T 1/60* (2013.01); *G06T 7/00* (2013.01); *G06T 7/586* (2017.01); *H04N 5/2256* (2013.01); *H04N 5/33* (2013.01); *H04N 5/332* (2013.01); *H04N 9/045* (2013.01); *H04N 13/128* (2018.05); *H04N 13/239* (2018.05); *H04N 13/25* (2018.05); *H04N 13/254* (2018.05); *H04N 13/271* (2018.05); *H04N 17/002* (2013.01); *A63F 13/213* (2014.09); *G02B 27/4233* (2013.01); *G06T 2207/30244* (2013.01); *H04N 2013/0081* (2013.01)

(56) References Cited

U.S. PATENT DOCUMENTS

| | | | |
|---|---|---|---|
| 5,471,326 A | 11/1995 | Hall et al. | |
| 5,586,200 A | 12/1996 | Devaney et al. | |
| 5,739,906 A | 4/1998 | Evans et al. | |
| 6,105,139 A | 8/2000 | Dey et al. | |
| 6,751,344 B1 | 6/2004 | Grumbine | |
| 7,315,383 B1 | 1/2008 | Abdollahi | |
| 7,512,262 B2 | 3/2009 | Criminisi et al. | |
| 7,565,003 B2 | 7/2009 | Ashizaki et al. | |
| 7,634,395 B2 | 12/2009 | Flandrin et al. | |
| 8,077,034 B2 | 12/2011 | Borlez et al. | |
| 8,331,654 B2 | 12/2012 | Abraham et al. | |
| 8,442,940 B1 | 5/2013 | Faletti et al. | |
| 8,787,656 B2 | 7/2014 | Park et al. | |
| 8,818,077 B2 | 8/2014 | Hwang | |
| 9,508,003 B2 | 11/2016 | Eguro et al. | |
| 9,697,424 B2 | 7/2017 | Kirk et al. | |
| 9,760,770 B2 | 9/2017 | Eguro et al. | |
| 9,922,249 B2 | 3/2018 | Kang et al. | |
| 9,928,420 B2 | 3/2018 | Kirk et al. | |
| 9,959,465 B2 | 5/2018 | Georgiou et al. | |
| 2002/0136444 A1 | 9/2002 | Brown et al. | |
| 2003/0043270 A1 | 3/2003 | Rafey et al. | |
| 2003/0048459 A1 | 3/2003 | Gooch | |
| 2003/0081833 A1 | 5/2003 | Tilton | |
| 2004/0105580 A1 | 6/2004 | Hager et al. | |
| 2004/0125222 A1 | 7/2004 | Bradski et al. | |
| 2004/0201586 A1 | 10/2004 | Marschner et al. | |
| 2005/0058362 A1 | 3/2005 | Kita | |
| 2005/0234527 A1 | 10/2005 | Slatkine | |
| 2005/0257748 A1 | 11/2005 | Kriesel et al. | |
| 2005/0279172 A1 | 12/2005 | Schreier et al. | |
| 2006/0176306 A1 | 8/2006 | Nagaraj et al. | |
| 2006/0210146 A1 | 9/2006 | Gu | |
| 2006/0238714 A1 | 10/2006 | Fox et al. | |
| 2006/0291020 A1 | 12/2006 | Knox et al. | |
| 2007/0009150 A1 | 1/2007 | Suwa et al. | |
| 2007/0145273 A1 | 6/2007 | Chang | |
| 2007/0146512 A1 | 6/2007 | Suzuki et al. | |
| 2007/0183657 A1 | 8/2007 | Kidono et al. | |
| 2007/0253310 A1 | 11/2007 | Ikenaka | |
| 2007/0263903 A1 | 11/2007 | St. hilaire et al. | |
| 2008/0118143 A1 | 5/2008 | Gordon et al. | |
| 2008/0130015 A1 | 6/2008 | Lu | |
| 2008/0165357 A1 | 7/2008 | Stern et al. | |
| 2008/0187711 A1 | 8/2008 | Alam et al. | |
| 2008/0205748 A1 | 8/2008 | Lee et al. | |
| 2008/0218612 A1 | 9/2008 | Border et al. | |
| 2008/0283729 A1* | 11/2008 | Hosaka | H04N 5/332 250/208.1 |
| 2009/0021750 A1 | 1/2009 | Korner et al. | |
| 2009/0080048 A1 | 3/2009 | Tsao | |
| 2009/0096783 A1 | 4/2009 | Shpunt et al. | |
| 2009/0217213 A1 | 8/2009 | Meserve | |
| 2009/0217214 A1 | 8/2009 | Meserve | |
| 2009/0231425 A1 | 9/2009 | Zalewski | |
| 2009/0273679 A1* | 11/2009 | Gere | H04N 17/002 348/187 |
| 2010/0042964 A1 | 2/2010 | Meserve | |
| 2010/0046004 A1 | 2/2010 | Lee et al. | |
| 2010/0074532 A1 | 3/2010 | Gordon et al. | |
| 2010/0177164 A1 | 7/2010 | Zalevsky et al. | |
| 2010/0202725 A1 | 8/2010 | Popovich et al. | |
| 2010/0277571 A1 | 11/2010 | Xu et al. | |
| 2010/0289885 A1* | 11/2010 | Lu | H04N 5/2258 348/61 |
| 2011/0063427 A1 | 3/2011 | Fengler et al. | |
| 2011/0078189 A1 | 3/2011 | Bonchi et al. | |
| 2011/0091096 A1 | 4/2011 | Morris et al. | |
| 2011/0103711 A1 | 5/2011 | Su et al. | |
| 2011/0149031 A1 | 6/2011 | Um et al. | |
| 2011/0222757 A1 | 9/2011 | Yeatman et al. | |
| 2011/0228097 A1 | 9/2011 | Motta | |
| 2011/0310220 A1 | 12/2011 | Mceldowney | |
| 2012/0002045 A1 | 1/2012 | Tony et al. | |
| 2012/0025080 A1 | 2/2012 | Liu et al. | |
| 2012/0038986 A1 | 2/2012 | Pesach | |
| 2012/0056982 A1 | 3/2012 | Katz et al. | |
| 2012/0087572 A1 | 4/2012 | Dedeoglu et al. | |
| 2012/0120494 A1 | 5/2012 | Takayama | |
| 2012/0154397 A1 | 6/2012 | Chernikov et al. | |
| 2012/0155747 A1 | 6/2012 | Hwang | |
| 2012/0242829 A1 | 9/2012 | Shin et al. | |
| 2012/0253201 A1 | 10/2012 | Reinhold | |
| 2012/0281087 A1 | 11/2012 | Kruse | |
| 2012/0294510 A1 | 11/2012 | Zhang et al. | |
| 2012/0307075 A1 | 12/2012 | Margalit | |
| 2013/0002814 A1 | 1/2013 | Park et al. | |
| 2013/0003069 A1 | 1/2013 | Umeda et al. | |
| 2013/0051657 A1 | 2/2013 | Ostermann et al. | |
| 2013/0083062 A1 | 4/2013 | Geisner et al. | |
| 2013/0095302 A1 | 4/2013 | Pettis et al. | |
| 2013/0100256 A1 | 4/2013 | Kirk et al. | |
| 2013/0100282 A1 | 4/2013 | Siercks | |
| 2013/0141545 A1 | 6/2013 | Macchia et al. | |
| 2013/0141611 A1* | 6/2013 | Hirai | H04N 9/045 348/231.3 |
| 2013/0215235 A1 | 8/2013 | Russell | |

(56) References Cited

U.S. PATENT DOCUMENTS

| | | |
|---|---|---|
| 2013/0229396 A1 | 9/2013 | Huebner |
| 2013/0265623 A1 | 10/2013 | Sugiyama et al. |
| 2013/0278631 A1 | 10/2013 | Border et al. |
| 2013/0287291 A1 | 10/2013 | Cho |
| 2013/0335531 A1 | 12/2013 | Lee et al. |
| 2014/0055560 A1 | 2/2014 | Fu et al. |
| 2014/0098342 A1 | 4/2014 | Webb |
| 2014/0104387 A1 | 4/2014 | Klusza et al. |
| 2014/0112573 A1 | 4/2014 | Francis et al. |
| 2014/0120319 A1 | 5/2014 | Joseph |
| 2014/0132501 A1 | 5/2014 | Choi et al. |
| 2014/0132728 A1 | 5/2014 | Verano et al. |
| 2014/0139717 A1 | 5/2014 | Short |
| 2014/0168380 A1 | 6/2014 | Heidemann et al. |
| 2014/0180639 A1 | 6/2014 | Cheatham et al. |
| 2014/0184584 A1 | 7/2014 | Reif et al. |
| 2014/0206443 A1 | 7/2014 | Sharp et al. |
| 2014/0225985 A1 | 8/2014 | Klusza et al. |
| 2014/0225988 A1 | 8/2014 | Poropat |
| 2014/0241612 A1 | 8/2014 | Rhemann et al. |
| 2014/0293011 A1 | 10/2014 | Lohry et al. |
| 2014/0307047 A1 | 10/2014 | Kirk et al. |
| 2014/0307055 A1 | 10/2014 | Kang et al. |
| 2014/0307057 A1 | 10/2014 | Kang et al. |
| 2014/0307058 A1 | 10/2014 | Kirk et al. |
| 2014/0307307 A1 | 10/2014 | Georgiou et al. |
| 2014/0307952 A1 | 10/2014 | Sweeney et al. |
| 2014/0307953 A1 | 10/2014 | Kirk et al. |
| 2014/0309764 A1 | 10/2014 | Socha-leialoha et al. |
| 2014/0310496 A1 | 10/2014 | Eguro et al. |
| 2014/0320605 A1 | 10/2014 | Johnson |
| 2014/0354803 A1 | 12/2014 | Chida |
| 2015/0078672 A1 | 3/2015 | Eguro et al. |
| 2015/0316368 A1 | 11/2015 | Moench et al. |
| 2018/0173947 A1 | 6/2018 | Kang et al. |
| 2018/0218210 A1 | 8/2018 | Georgiou et al. |
| 2018/0260623 A1 | 9/2018 | Kang et al. |

FOREIGN PATENT DOCUMENTS

| | | |
|---|---|---|
| CN | 1414420 A | 4/2003 |
| CN | 1445724 A | 10/2003 |
| CN | 1541483 A | 10/2004 |
| CN | 1669051 A | 9/2005 |
| CN | 1735789 A | 2/2006 |
| CN | 101061367 A | 10/2007 |
| CN | 101124514 A | 2/2008 |
| CN | 101309429 A | 11/2008 |
| CN | 101443809 A | 5/2009 |
| CN | 101501442 A | 8/2009 |
| CN | 101509764 A | 8/2009 |
| CN | 101711354 A | 5/2010 |
| CN | 101878409 A | 11/2010 |
| CN | 102027434 A | 4/2011 |
| CN | 102036599 A | 4/2011 |
| CN | 102231037 A | 11/2011 |
| CN | 102362150 A | 2/2012 |
| CN | 102385237 A | 3/2012 |
| CN | 102572485 A | 7/2012 |
| CN | 102638692 A | 8/2012 |
| CN | 102760234 A | 10/2012 |
| CN | 102803894 A | 11/2012 |
| CN | 102831380 A | 12/2012 |
| CN | 103308517 A | 9/2013 |
| EP | 0085210 A1 | 8/1983 |
| EP | 2295932 A1 | 3/2011 |
| EP | 2400261 A1 | 12/2011 |
| GB | 2481459 A | 12/2011 |
| JP | 2000341721 A | 12/2000 |
| JP | 2003058911 A | 2/2003 |
| JP | 2004135209 A | 4/2004 |
| JP | 2005-341470 A | 12/2005 |
| JP | 2006229802 A | 8/2006 |
| JP | 2009014501 A | 1/2009 |
| JP | 2010011223 A | 1/2010 |
| JP | 2010145186 A | 7/2010 |
| JP | 2011514232 A | 5/2011 |
| JP | 2013544449 A | 12/2013 |
| KR | 20110132260 A | 12/2011 |
| RU | 2237284 C2 | 9/2004 |
| WO | 2006016303 A2 | 2/2006 |
| WO | 2007132399 A1 | 11/2007 |
| WO | 2009046268 A1 | 4/2009 |
| WO | 2012137434 A1 | 10/2012 |

OTHER PUBLICATIONS

"International Search Report & Written Opinion Issued in PCT Patent Application No. PCT/US2014/033909", dated Jul. 25, 2014, 16 Pages.

"Second Written Opinion Issued in PCT Patent Application No. PCT/US2014/033909", dated Mar. 25, 2015, 14 Pages.

"First Office Action and Search Report Issued in Chinese Patent Application No. 201480021958.7", dated Oct. 18, 2017, 19 Pages.

"Final Office Action Issued in U.S. Appl. No. 13/915,626", dated Jul. 11, 2016, 13 Pages.

"Final Office Action Issued in U.S. Appl. No. 13/915,626", dated Mar. 28, 2017, 17 Pages.

"Non Final Office Action Issued in U.S. Appl. No. 13/915,626", dated Dec. 9, 2016, 16 Pages.

"Non Final Office Action Issued in U.S. Appl. No. 13/915,626", dated Jan. 29, 2016, 17 Pages "Final Office Action Issued in U.S. Appl. No. 13/918,892", dated Dec. 21, 2016, 6 Pages.

"Final Office Action Issued in U.S. Appl. No. 13/918,892", dated Nov. 19, 2015, 7 Pages.

"Non Final Office Action Issued in U.S. Appl. No. 13/918,892", dated Mar. 28, 2016, 6 Pages.

"Non Final Office Action Issued in U.S. Appl. No. 13/918,892", dated May 11, 2015, 6 Pages.

"Final Office Action Issued in U.S. Appl. No. 13/923,135", dated Jul. 27, 2015, 21 Pages.

"Final Office Action Issued in U.S. Appl. No. 13/923,135", dated Oct. 3, 2016, 15 Pages.

"Non Final Office Action Issued in U.S. Appl. No. 13/923,135", dated May 5, 2017, 17 Pages.

"Non Final Office Action Issued in U.S. Appl. No. 13/923,135", dated Mar. 31, 2016, 14 Pages.

"Non Final Office Action Issued in U.S. Appl. No. 13/923,135", dated Dec. 19, 2014, 13 Pages.

"Final Office Action Issued in U.S. Appl. No. 13/924,464", dated Dec. 17, 2015, 25 Pages.

"Final Office Action Issued in U.S. Appl. No. 13/924,464", dated Sep. 15, 2016, 25 Pages.

"Final Office Action Issued in U.S. Appl. No. 13/924,464", dated Sep. 27, 2017, 37 Pages.

"Non Final Office Action Issued in U.S. Appl. No. 13/924,464", dated May 5, 2017, 38 Pages.

"Non Final Office Action Issued in U.S. Appl. No. 13/924,464", dated May 17, 2016, 26 Pages.

"Non Final Office Action Issued in U.S. Appl. No. 13/924,464", dated Aug. 10, 2015, 20 Pages.

"Final Office Action Issued in U.S. Appl. No. 13/924,475", dated May 6, 2016, 13 Pages.

"Non Final Office Action Issued in U.S. Appl. No. 13/924,475", dated Sep. 8, 2016, 15 Pages.

"Non Final Office Action Issued in U.S. Appl. No. 13/924,475", dated Mar. 24, 2015, 17 Pages.

"Non Final Office Action Issued in U.S. Appl. No. 13/924,475", dated Oct. 7, 2015, 14 Pages.

"Final Office Action Issued in U.S. Appl. No. 13/924,485", dated Sep. 13, 2016, 16 Pages.

"Final Office Action Issued in U.S. Appl. No. 13/924,485", dated Jul. 20, 2017, 16 Pages.

"Non Final office Action issued in U.S. Appl. No. 13/924,485", dated Dec. 15, 2015, 15 Pages.

"Non-Final Office Action Issued in U.S. Appl. No. 13/924,485", dated Mar. 7, 2017, 16 Pages.

(56) References Cited

OTHER PUBLICATIONS

"Final Office Action Issued in U.S. Appl. No. 13/925,762", dated May 11, 2016, 22 Pages.
"Final Office Action Issued in U.S. Appl. No. 13/925,762", dated May 9, 2017, 26 Pages.
"Non Final Office Action Issued in U.S. Appl. No. 13/925,762", dated Oct. 3, 2016, 28 Pages.
"Non Final Office Action Issued in U.S. Appl. No. 13/925,762", dated Nov. 5, 2015, 13 Pages.
"Non Final Office Action Issued in U.S. Appl. No. 14/088,408", dated Sep. 29, 2016, 16 Pages.
"Final Office Action Issued in U.S. Appl. No. 14/253,696", dated Feb. 25, 2016, 23 Pages.
"Non Final Office Action Issued in U.S. Appl. No. 14/253,696", dated Sep. 10, 2015, 18 Pages.
"Notice of Allowance Issued in U.S. Appl. No. 14/253,696", dated Jul. 21, 2016, 17 Pages.
"Office Action Issued in European Patent Application No. 14723271.4", dated Sep. 19, 2016, 9 Pages.
"Office Action Issued in European Patent Application No. 14723271.4", dated Jun. 29, 2017, 12 Pages.
"Oral Hearing Issued in European Patent Application No. 14723271.4", Mailed Date: Mar. 29, 2018, 16 Pages.
"Office Action Issued in Australian Patent Application No. 2014254219", dated Apr. 19, 2017, 3 Pages.
"First Office Action and Search Report Issued in Chinese Patent Application No. 201480021199.4", dated May 31, 2017, 17 Pages.
"Second Office Action Issued in Chinese Patent Application No. 201480021199.4", dated Jan. 17, 2018, 7 Pages.
"Third Office Action Issued in Chinese Patent Application No. 201480021199.4", dated Jun. 19, 2018, 13 Pages.
"Office Action Issued in Chinese Patent Application No. 201480021422.5", dated Jul. 5, 2018, 10 Pages.
"First Office Action & Search Report Issued in Chinese Patent Application No. 201480021422.5", dated Mar. 21, 2017, 16 Pages.
"Second Office Action Issued in Chinese Patent Application No. 201480021422.5", dated Dec. 11, 2017, 14 Pages.
"First Office Action and Search Report Issued in Chinese Patent Application No. 201480021460.0", dated Mar. 28, 2017, 17 Pages.
"Second Office Action Issued in Chinese Patent Application No. 201480021460.0", dated Dec. 11, 2017, 6 Pages.
"Third Office Action Issued in Chinese Patent Application No. 201480021460.0", dated Jul. 2, 2018, 7 Pages.
"Office Action Issued in Chinese Patent Application No. 201480021487.X", dated Jun. 20, 2018, 7 Pages.
"First Office Action Issued in Chinese Application No. 201480021487.X", dated Apr. 21, 2017, 13 Pages.
"Second Office Action Issued in Chinese Patent Application No. 201480021487.X", dated Dec. 15, 2017, 10 Pages.
"Office Action Issued in Chinese Patent Application No. 201480021493.5", dated Dec. 19, 2017, 12 Pages.
"Second Office Action Issued in Chinese Patent Application No. 201480021493.5", dated Aug. 15, 2018, 10 Pages.
"Office Action Issued in Chinese Patent Application No. 201480021519.6", dated Sep. 4, 2018, 10 Pages.
"First Office Action and Search Report Issued in Chinese Patent Application No. 201480021519.6", dated Aug. 30, 2016, 18 Pages.
"Fourth Office Action Issued in Chinese Patent Application No. 201480021519.6", dated Mar. 8, 2018, 15 Pages.
"Office Action Issued in Chinese Patent Application No. 201480021519.6", dated Sep. 19, 2017, 14 Pages.
"Second Office Action and Search Report Issued in Chinese Patent Application No. 201480021519.6", dated Mar. 30, 2017, 17 Pages.
"First Office Action and Search Report Issued in Chinese Patent Application No. 201480021528.5", dated Dec. 11, 2017, 14 Pages.
"Second Office Action Issued in Chinese Patent Application No. 201480021528.5", dated Aug. 2, 2018, 8 Pages.
"Second Office Action Issued in Chinese Patent Application No. 201480021958.7", dated Jun. 13, 2018, 16 Pages.
"Office Action Issued in Russian Patent Application No. 2015143654", dated Jan. 31, 2018, 8 Pages.
"Office Action Issued in Japanese Patent Application No. 2016-508993", dated Feb. 6, 2018, 5 Pages.
"Office Action Issued in Japanese Patent Application No. 2016-508993", dated Aug. 7, 2018, 5 Pages.
Anderson, et al., "The IBM System/360 Model 91: Machine Philosophy and Instruction-Handling", Published in IBM Journal of Research and Development, vol. 11, Issue 1, Jan. 1, 1967, pp. 8-24.
Chan, et al., "Regular Stereo Matching Improvement System Based on Kinect-Supporting Mechanism", In Open Journal of Applied Sciences, vol. 3, Issue 1, Mar. 30, 2013, 5 Pages.
Chihoub, et al., "A Band Processing Imaging Library for a Tricore-Based Digital Still Camera", In Research Article of Real-Time Imaging, vol. 7, Issue 4, Aug. 1, 2001, pp. 327-337.
Gao, et al., "Stereo Matching Algorithm Based on Illumination Normal Similarity and Adaptive Support Weight", In Optical Engineering, vol. 52, Issue 2, Feb. 2013, 8 Pages.
Gu, et al., "Trinocular Disparity Estimation With Adaptive Support Weight and Disparity Calibration", In Optical Engineering, vol. 47, Issue 3, Mar. 1, 2008, 5 Pages.
Hariyama, et al., "Optimal Periodical Memory Allocation for Logic-In-Memory Image Processors", In Proceedings of the Emerging VLSI Technologies and Architectures (ISVLSI'06), Mar. 2, 2006, pp. 193-198.
Hosni, et al., "Near Real-Time Stereo With Adaptive Support Weight Approaches", In Proceedings of International Symposium 3D Data Processing, Visualization and Transmission, May 17, 2010, 8 Pages.
Kanade, et al., "Development of a Video-Rate Stereo Machine", In Proceedings of IEEE/RSJ International Conference on Intelligent Robots and Systems. Human Robot Interaction and Cooperative Robots, Aug. 5, 1995, pp. 95-100.
Kuon, et al., "FPGA Architecture: Survey and Challenges", In Foundations and Trends in Electronic Design Automation vol. 2, Issue 2, Apr. 18, 2008, pp. 135-253.
Langmann, et al., "Depth Camera Technology Comparison and Performance Evaluation", In Proceedings of the 1st International Conference on Pattern Recognition Applications and Methods, Feb. 2012, 7 Pages.
McIlroy, et al., "Kinectrack: Agile 6-DoF Tracking Using a Projected Dot Pattern", Published in IEEE International Symposium on Mixed and Augmented Reality (ISMAR), Nov. 5, 2012, 7 Pages.
"Office Action Issued in Mexican Patent Application No. Mx/a/2015/014577", dated Nov. 10, 2017, 3 Pages.
"International Preliminary Report on Patentability Issued in PCT Application No. PCT/US2014/033910", dated Jul. 24, 2015, 8 Pages.
"International Search Report and Written Opinion Issued in PCT Application No. PCT/US2014/033910", dated Jul. 25, 2014, 9 Pages.
"Second Written Opinion Received for PCT Patent Application No. PCT/US2014/033910", dated Dec. 18, 2014, 5 Pages.
"International Preliminary Report on Patentability Issued in PCT Application No. PCT/US2014/033911", dated Jul. 13, 2015, 6 Pages.
"International Search Report & Written Opinion Issued in PCT Application No. PCT/US2014/033911", dated Aug. 29, 2014, 8 Pages.
"Second Written Opinion Issued in PCT Application No. PCT/US2014/033911", dated Apr. 2, 2015, 5 Pages.
"International Preliminary Report on Patentability Issued in PCT Application No. PCT/US2014/033915", dated Apr. 7, 2015, 10 Pages.
"International Search Report and Written Opinion Issued in PCT Application No. PCT/US2014/033915", dated Jul. 16, 2014, 11 Pages.
"Second Written Opinion Issued in PCT Application No. PCT/US2014/033915", dated Jan. 8, 2015, 9 Pages.
"International Preliminary Report on Patentability Issued in PCT Application No. PCT/US2014/033916", dated Jul. 13, 2015, 7 Pages.

(56) References Cited

OTHER PUBLICATIONS

"International Search Report and Written Opinion Issued in PCT Application No. PCT/US2014/033916", dated Jul. 18, 2014, 8 Pages.

"Second Written Opinion Issued in PCT Application No. PCT/US2014/033916", dated Mar. 27, 2015, 6 Pages.

"International Preliminary Report on Patentability Issued in PCT Patent Application No. PCT/US2014/033917", dated Jul. 20, 2015, 8 Pages.

"International Search Report and Written Opinion Issued in PCT Application No. PCT/US2014/033917", dated Jul. 18, 2014, 10 Pages.

"International Preliminary Report on Patentability Issued in PCT Patent Application No. PCT/US2014/033919", dated Jul. 13, 2015, 7 Pages.

"International Search Report & Written Opinion Issued in PCT Application No. PCT/US2014/033919", dated Jul. 17, 2014, 8 Pages.

"Second Written Opinion Issued in PCT Application No. PCT/US2014/033919", dated Mar. 27, 2015, 6 Pages.

"International Search Report Issued in PCT Application No. PCT/US2014/033996", dated Jul. 31, 2014, 3 Pages.

Yamaguchi, et al., "Interleaved Pixel Lookup for Embedded Computer Vision", In Proceedings of IEEE Computer Society Conference on Computer Vision and Pattern Recognition Workshops, Jun. 23, 2008, pp. 1-8.

Yang, et al., "Spatial-Depth Super Resolution for Range Images", In Proceedings of the IEEE Conference on Computer Vision and Pattern Recognition, Jun. 17, 2007, 8 Pages.

Yoon, et al., "Locally Adaptive Support-Weight Approach for Visual Correspondence Search", In Proceedings of IEEE Computer Society Conference on Computer Vision and Pattern Recognition, Jun. 20, 2005, 8 Pages.

"Connected component (Graph Theory)", Retrieved From: https://en.wikipedia.org/w/index.php?title=Connected_component_(graph_theory)&oldid=841872370, May 18, 2018, 3 Pages.

"Third Office Action Issued in Chinese Patent Application No. 201480021958.7", dated Dec. 3, 2018, 10 Pages.

* cited by examiner

EXTRACTING TRUE COLOR FROM A COLOR AND INFRARED SENSOR

CROSS-REFERENCE TO RELATED APPLICATION

The present application claims priority to U.S. provisional patent application Ser. No. 61/812,232, filed Apr. 15, 2013.

BACKGROUND

Some contemporary imaging devices contain multi-component sensors comprising color (R, G, B) and infrared photosites (where R, G and B are sometimes used herein for red, green and blue, respectively, and IR for infrared). Depending on an environment in which the sensor is used, the R, G, and B part of the photosites (referred to as $R_0$, $G_0$, $B_0$ hereinafter where the subscript zero represents the component state as initially captured) often contain a significant amount of IR component, such as when ambient light contains IR, or when IR is projected into a scene for depth sensing or other purposes.

When the captured $R_0$, $G_0$, $B_0$ data contains IR information, the data do not provide true color information. For example, if the data are used directly for demosaicing (to generate per pixel RGB), the resulting colors look washed out.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more of various aspects of the subject matter described herein are directed towards calibrating a color correction (extraction) transform that corrects for infrared light in at least one of red, green or blue parts of a photosite. Ground truth color data is captured as raw image data via a sensor comprised of photosites. The ground truth color data is also captured as long-pass-filtered image data via the sensor capturing through a long pass filter. The long-pass-filtered image data for at least one of the red, green or blue parts of a photosite of the sensor are subtracted from the raw image data for each corresponding part of the photosite to obtain true color data values for the photosite. Data corresponding to the true color data values are used to produce one or more tables or curves that are accessible during online usage to color correct an image.

In one or more aspects, a sensor comprising photosites having infrared, red, green, and blue parts is configured to capture a first image of ground truth data without a filter, capture a second image of the ground truth data with a long pass filter, and capture a third image of the ground truth data with a short pass filter. A processing component obtains true red, green and blue data based upon the first and second images, and obtains true infrared data based upon the first and third images. The processing component outputs data corresponding the true red, green and blue data and true infrared data into one or more tables or curves.

One or more aspects are directed towards (a) selecting a current infrared value, (b) accessing table or curve data to determine predicted red, green and blue values based upon the current infrared value, (c) accessing table or curve data to determine a predicted infrared value based upon the predicted red, green and blue values, (d) setting the current infrared value as the predicted infrared value, (e) returning to step (b) until a stopping criterion is met; and (f) outputting an infrared value and red green and blue values based upon the current infrared value and last predicted red, green and blue values.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards extracting true RGB from sensor data. In one aspect, this is facilitated by a calibration process, e.g., using ground truth colors (e.g., a color chart) to determine how a specific camera or the like captures R, G, B and IR values in the presence of IR illumination. Note that as used herein, "true" is an inexact, relative concept, and thus the calibration is based upon whatever is decided as ground truth, subject to varying lighting conditions and the like. Further, curves, tables, mappings and/or other structures and the like described below may use approximations, interpolations and so forth, whereby "true" typically means approximately achieving or approaching the ground truth, e.g., to the extent possible. In practice, significant improvement in image appearance has been obtained by outputting true color after compensating for IR.

It should be understood that any of the examples herein are non-limiting. For instance, while the examples herein are directed towards "true" RGB being approximated using IR component data, "true" IR may be approximated using RGB component data. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in image processing in general.

Figure 1A:
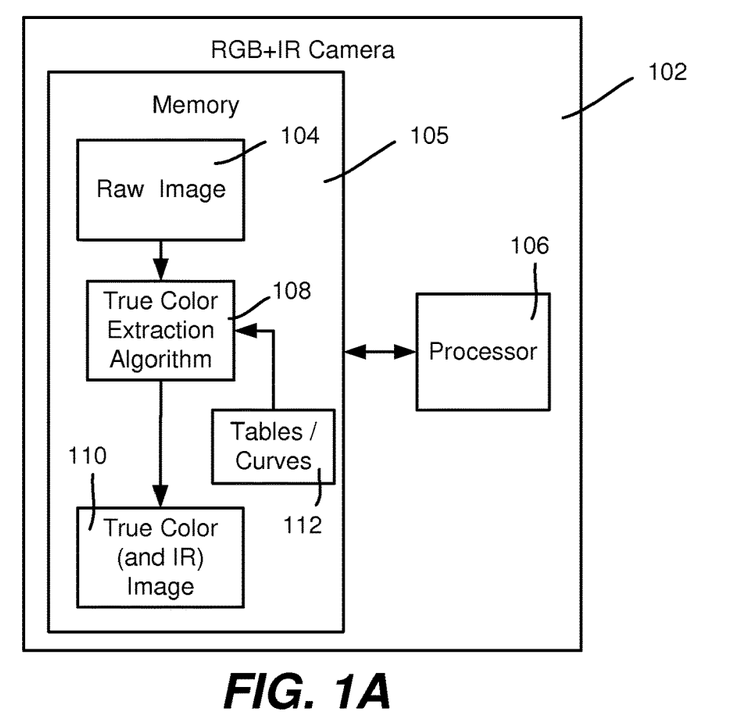
FIGS. 1A and 1B are block diagrams representing example cameras configured to color correct for infrared contamination of red, green and blue photosites, according to one or more example implementations.

FIG. 1A shows an example system in which an RGB and IR camera 102 processes an image into true color, and optionally true IR. In general, a source (e.g., raw) image 104 in memory 105 is processed as described herein via processor 106 and true color extraction algorithm 108 (described below) into a true color, and optionally true IR image 110. As described below, the true color extraction algorithm 108 uses tables/curves 112 (and/or other data) computed during an earlier calibration procedure. Note that rather than performing the processing in the camera, the camera may be coupled to an external computing device to perform the processing, e.g., feeding raw images to the computing device for IR correction, with the true color/IR image used thereafter as desired.

Figure 1B:
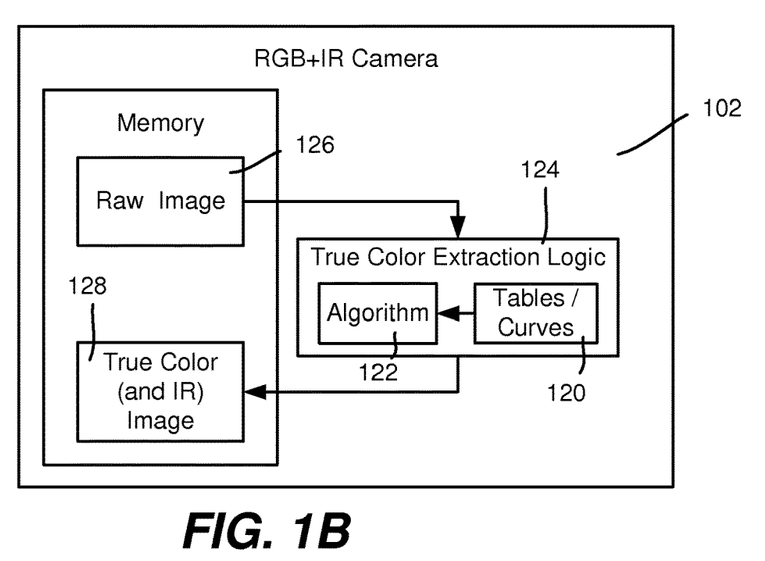

FIG. 1B is similar to FIG. 1A, except that instead of memory or other computer-readable storage and executable processor instructions, instances of the tables/curves 120 (and/or other data) and algorithm 122 are coded into logic 124 as data and instructions, respectively. The logic 124 executes the instructions to convert a raw (source) image 126 into a true color/IR image 128. Note that other image processing techniques may be performed before or after running the true color extraction algorithm or logic, and thus the source image may be as originally captured or modified in some way by another procedure. For purpose of brevity, a source image is sometimes referred to as a "raw" image as if captured "as is" regardless of any other image processing.

Figure 2:
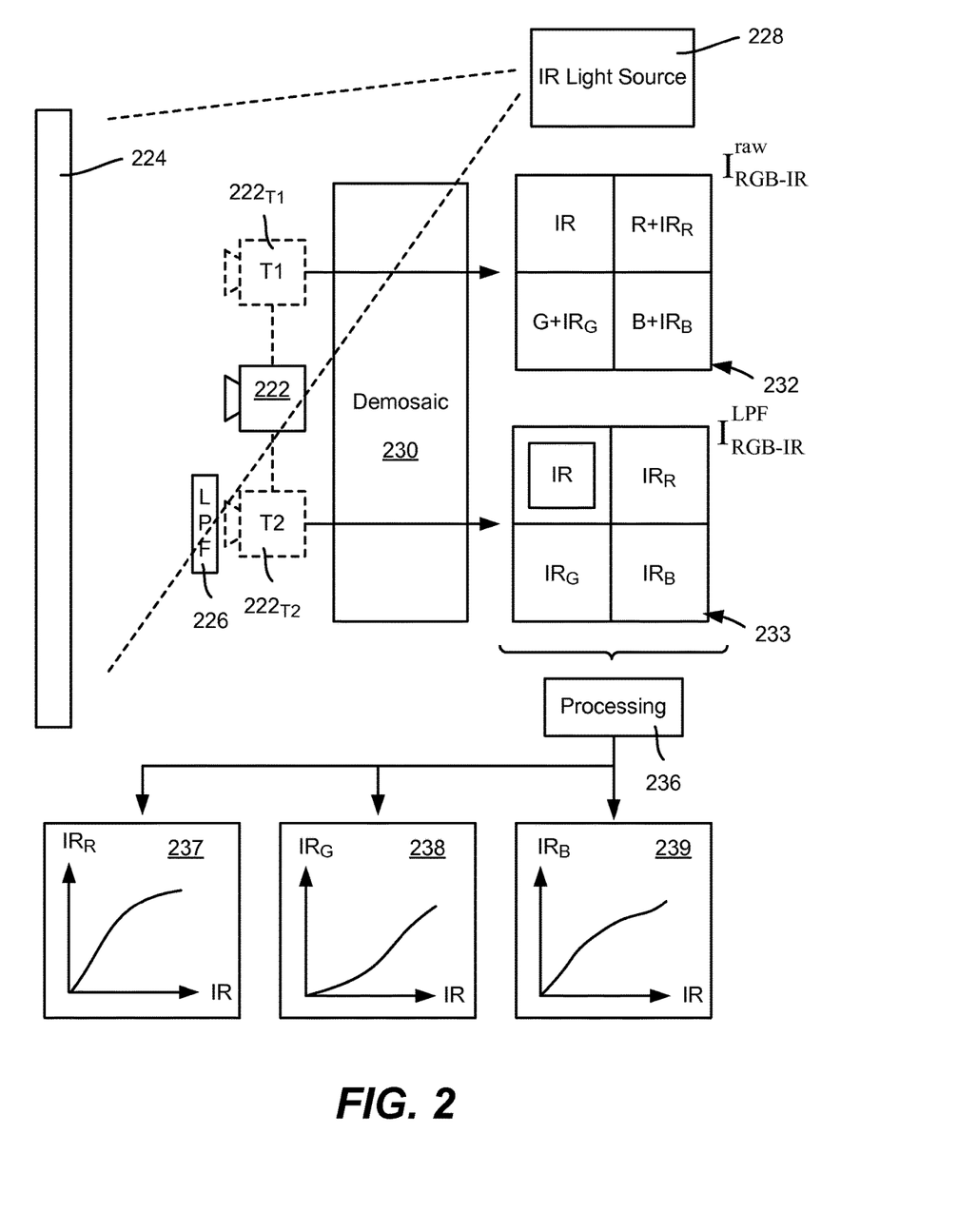
FIG. 2 is a representation of an example color correction calibration procedure based upon capturing images via long pass filtering versus non-filtering, according to one or more example implementations.

FIG. 2 shows an example calibration process, which, for example may be part of the manufacturing process, or performed at a later time on any camera that has the suitable hardware, firmware and/or software capabilities to implement the algorithm/logic. In FIG. 2, the same camera 222 is used to take (at least one) image of a ground truth color data, such as a fixed color chart 224. For purposes of illustration, in FIG. 2 (dashed instances of) the camera 222 are shown at two different "positions" $222_{T1}$ and $222_{T2}$ representing two different times, but in reality the camera 222 is not moved, and is generally centered in front of the color chart 224. The difference is not in physical camera position, but rather that at time T2, a low pass filter 226 is placed in front of the camera to block visible light unlike at time T1.

The color chart may, for example, be any known set of differently-colored patches or the like, but in one implementation was a six column by four-column grid of twenty-four different colors (including black white and gray variations). Each color in the grid corresponded to fixed, known R, G and B values.

An IR light source 228 may be used to project a consistent level of IR onto the color chart 224, generally under controlled lighting conditions. As described below, the IR light source may be variable so that different amounts of IR may be emitted for different types of calibration, or different IR light sources may be used. Note that the IR light source may be centered (e.g., slightly above or below) the camera at a suitable distance so that the color chart is illuminated relatively evenly. Notwithstanding, the amount of IR is determined at a per-pixel level and subtracted out in one implementation, whereby reasonable variations in the IR value across the color chart are not significant.

In reality, infrared (or near infrared, NIR, which is synonymous with IR as used herein) contaminates the R, G and B values detected by a camera sensor, whereby additional processing is needed to get the (approximately) true RGB-IR values at each pixel. The output may be generated using a "demosaicing" process as shown by block 230 in FIG. 2.

As can be seen, the photosites 232 and 233 contains the values captured with no filter and with the long pass filter that blocks visible light, respectively. Thus, the non-filtered (raw) photosite 232 comprises IR, and R, G, and B values contaminated with some amount of IR, shown as $R+IR_R$, $G+IR_G$, and $B+IR_B$. The long-pass-filtered photosite 233 contains IR, $IR_R$, $IR_G$, $IR_B$ values.

In a processing component 236, subtracting the filtered IR from each of the raw R, G and B parts removes the difference ($\Delta$) that the IR contamination is contributing:

$$I_{RGB-IR}{}^{\Delta} = I_{RGB-IR}{}^{raw} - I_{RGB-IR}{}^{LPF}.$$

The first part of the above equation corresponds to $R^{\Delta}$, $G^{\Delta}B^{\Delta}$, which can be linearized through radiometric calibration, for example, which is a known technique in image processing to compensate for sensors' non-linear response to light. The non-linearity may be modeled in any of many known ways, e.g., empirically determined via various images captured in different lighting conditions.

Once linearized, an affine matrix transform may be offline computed for performing true RGB correction, which may then be used "online" in actual usage. The following describes the transform, which may be modeled as lookup tables/curves (e.g., corresponding to blocks 237-239 in FIG. 2) ; (assuming some belief of IR leakage; because the camera has an IR sensor, the information from that sensor also may be used):

$$A_{3\times 4} \begin{pmatrix} R_0 \\ G_0 \\ B_0 \\ IR_0 \end{pmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix} \begin{pmatrix} R_0 \\ G_0 \\ B_0 \\ IR_0 \end{pmatrix} = \begin{pmatrix} R \\ G \\ B \end{pmatrix}.$$

In one alternative, where IR leakage is discounted, the IR component may be ignored, whereby a 3×3 matrix may be used.

In another alternative, (shown in the block diagram of FIG. 3), which is suitable when the IR photosites contain a significant amount of visible light information, the calibration technique can be modified to use an additional set of images with a short-pass filter 335 (SPF) to block the IR, in addition to the long-pass filter (LPF) to block this visible light. This calibration procedure with additional SPF steps is also exemplified in example steps of FIG. 4; (the flow diagram applies to the non-SPF procedure by removing steps 406 and 410, which are identified in the flow diagram as "optional").

Figure 3:
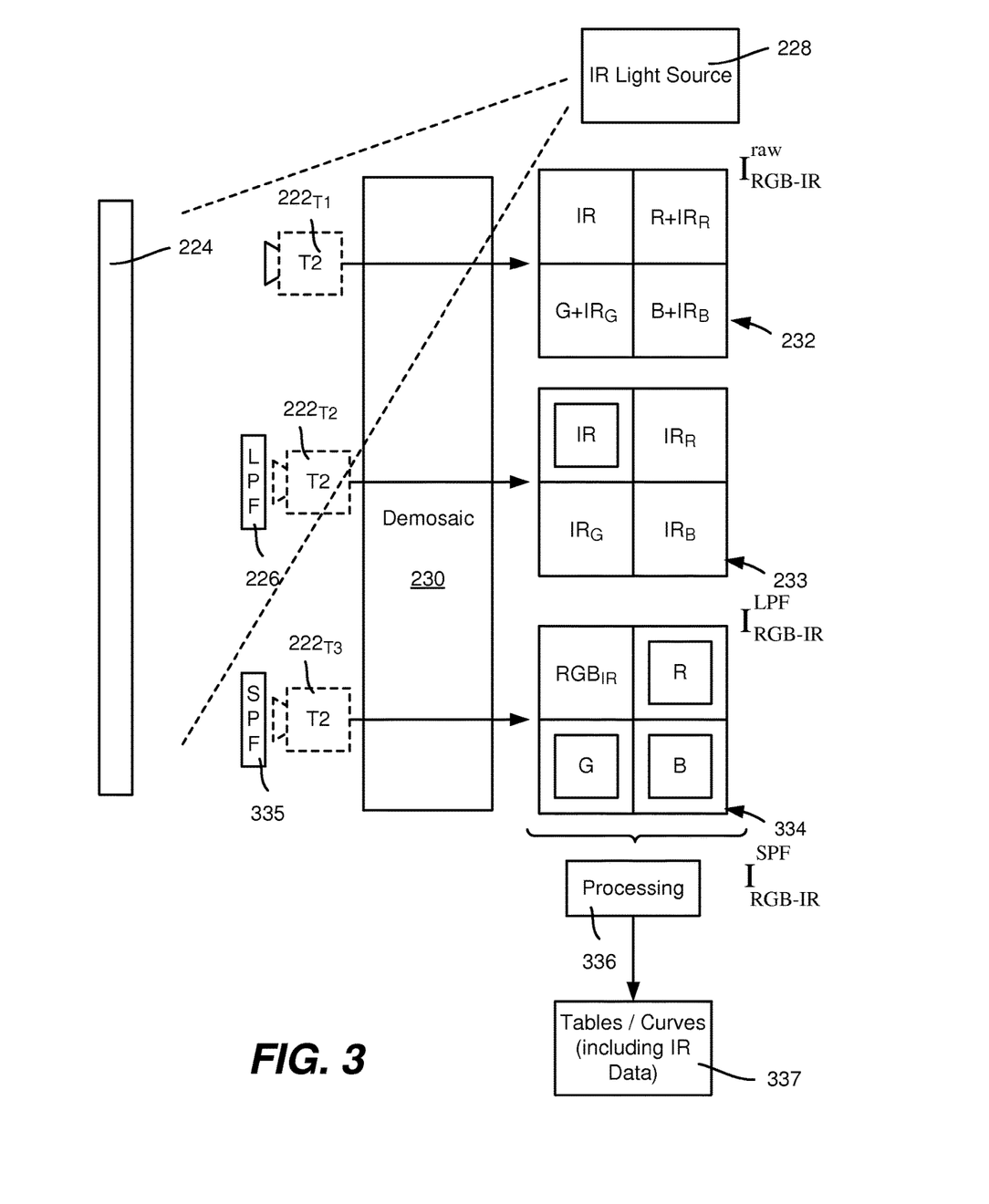
FIG. 3 is a representation of an example color correction calibration procedure based upon capturing images via long pass filtering versus non-filtering, and short pass filtering versus non-filtering, according to one or more example implementations.

This calibration configuration in FIG. 3 also has the same camera used at three different times, namely to capture raw, long-pass-filtered and short-pass-filtered images; (however a "solid-line" camera is not shown in FIG. 3 as in FIG. 2 to keep the FIG. 3 simple). The capturing is shown via steps 402, 404 and 406.

The boxed "IR" (when the long pass filter is used) in photosite 233, and boxed "R", "G", and "B" (when the short pass filter is used) in photosite 334, represent the true signals to recover. As before, subtraction (in block 336 of FIG. 3) may be used to remove the IR component from the R, G and B (step 408), along with (in this alternative) subtraction to remove the R, G and B components (step 410). Linearization or nomalization (also represented in block 336) is then performed at step 412.

Once the signals are linearized, "true" RGB may be used to predict $RGB_{IR}$. At step 414 a mapping C may be used to map RGB to $RGB_{IR}$ (three dimensions to one dimension). As before, "true" IR may be used to predict $IR_R$, I $R_G$, $IR_B$ (three one-to-one mappings: "true" IR to $IR_R$, "true" IR to I $R_G$, "true" IR to $IR_B$). Each mapping can be in a form of lookup tables or fitted parametric curves (referred to as tables/curves $Q_R$, $Q_G$, $Q_B$), shown in FIG. 3 as block 337. The 3×4 (or 3×3) transform is not shown again.

After calibration, the tables/curves are known, and can be stored in the camera as in FIGS. 1A and 1B. During live operation, filtering is not available, such that for any photosite of a raw image:

$IR_0=IR+RGB_{IR}$, $R_0=R+IR_R$, $G_0=G+IR_G$, $B_0=B+IR_B$.

Figure 5:
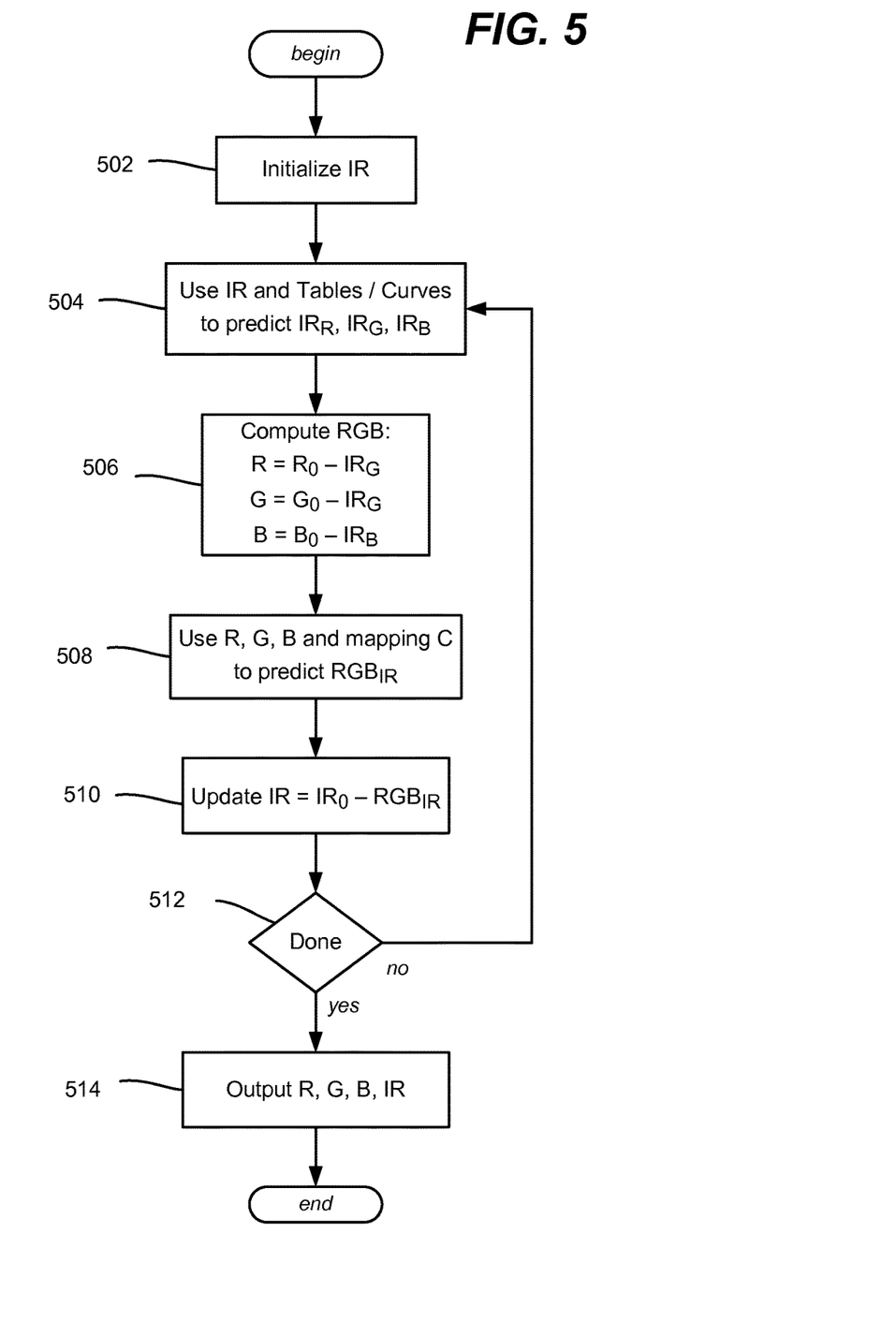
FIG. 5 is a flow diagram representing example steps that may be taken as part of color correction during online image processing, according to one or more example implementations.

To get true R, G, B, IR, the following procedure (also shown in example steps in the flow diagram of FIG. 5) may be used:

Step 502: Initialize $IR=a*IR_0$, where a is a specified value between 0.5 and 1.0.

Step 504: Use IR, $Q_R$, $Q_G$ and $Q_B$ to predict $IR_R$, $IR_G$, $IR_B$.

Step 506: Compute R, G, B from $IR_R$, $IR_G$, $IR_B$:

$R=R_0-IR_R$, $G=G_0-IR_G$, $B=B_0-IR_B$.

Step 508: Use R, G, B and mapping C to predict $RGB_{IR}$.
Step 510: Update $IR=IR_0-RGB_{IR}$.

Step 512 repeats the process from step 504 until convergence (e.g., the updated IR value does not change over some number of iterations), or for a fixed number of steps. Step 514 outputs the computed true values. As can be seen, this process iteratively hones in on the true values by predicting the IR component to predict a closer true R, G, B and uses those predicted R, G, B values to find a closer IR value, which is used to find even closer R, G, B values and so on, until some convergence is reached or some iteration limit is reached. The process may be repeated for each photosite. The process can be done in the other order, that is, by starting with RGB values and predicting IR, then updating the RGB with the predicted IR and so on.

Note that this is only one example, and that other optimizations may be used to extract (R, G, B, IR) from the original data ($R_0$, $G_0$, $B_0$, $IR_0$).

In another alternative, IR illumination may be changed via a variable or multiple IR light sources; filters may or may not be used. The calibration thus captures the color chart under different IR lighting conditions. The different IR lighting conditions allow effective separation of true color from the IR component.

The linearization may be done via lookup tables generated using a standard technique involving multiple exposures, while the matrix transform $M_{3\times4}$ is extracted through the calibration process involving a color chart. Since there is no ground-truth for IR when no filters are used, the data may be used as-is and directly interpolated.

The equation for mapping the inputs $R_0$, $G_0$, $B_0$, and $IR_0$ to RGB is the same as above, that is:

$$A_{3\times 4}\begin{pmatrix} R_0 \\ G_0 \\ B_0 \\ IR_0 \end{pmatrix} = \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix} \begin{pmatrix} R_0 \\ G_0 \\ B_0 \\ IR_0 \end{pmatrix} = \begin{pmatrix} R \\ G \\ B \end{pmatrix}.$$

Each block in the color chart has a unique known color. To deal with the multiple image captures, Let N=P×Q, where P is the number of blocks in the chart and Q the number of image captures, each under different IR illumination conditions. To extract RGB, the following over-determined linear equations are solved:

$$\begin{pmatrix} R_0^{(1)} & G_0^{(1)} & B_0^{(1)} & IR_0^{(1)} \\ \vdots & \vdots & \vdots & \vdots \\ R_0^{(N)} & G_0^{(N)} & B_0^{(N)} & IR_0^{(N)} \end{pmatrix} \begin{pmatrix} a_{11} \\ a_{12} \\ a_{13} \\ a_{14} \end{pmatrix} = \begin{pmatrix} R^{(1)} \\ \vdots \\ R^{(N)} \end{pmatrix}$$

$$\begin{pmatrix} R_0^{(1)} & G_0^{(1)} & B_0^{(1)} & IR_0^{(1)} \\ \vdots & \vdots & \vdots & \vdots \\ R_0^{(N)} & G_0^{(N)} & B_0^{(N)} & IR_0^{(N)} \end{pmatrix} \begin{pmatrix} a_{21} \\ a_{22} \\ a_{23} \\ a_{24} \end{pmatrix} = \begin{pmatrix} G^{(1)} \\ \vdots \\ G^{(N)} \end{pmatrix}$$

$$\begin{pmatrix} R_0^{(1)} & G_0^{(1)} & B_0^{(1)} & IR_0^{(1)} \\ \vdots & \vdots & \vdots & \vdots \\ R_0^{(N)} & G_0^{(N)} & B_0^{(N)} & IR_0^{(N)} \end{pmatrix} \begin{pmatrix} a_{31} \\ a_{32} \\ a_{33} \\ a_{31} \end{pmatrix} = \begin{pmatrix} B^{(1)} \\ \vdots \\ B^{(N)} \end{pmatrix}$$

The above techniques are based upon broad spectrum distribution, which may not be the case. Thus, in any alternative, calibration may be performed under different lighting conditions, with a different affine matrix computed for each lighting condition. For example, one lighting condition may be general room lighting, another may be dark room with some IR lighting, and so forth. It may also be desirable (or needed) to have multiple affine transforms for the same lighting condition, split based on an amount of IR that is present.

After calibration during online operation, a broad spectral distribution (or user input) may be used to estimate the current lighting condition, and the estimated lighting condition used to select the matching calibration parameters to apply. An option is to compute a weighting scheme based on a similarity measure between the current lighting condition and the predefined ones, and weight average the pixel values as output.

Example Operating Environment

Figure 4:
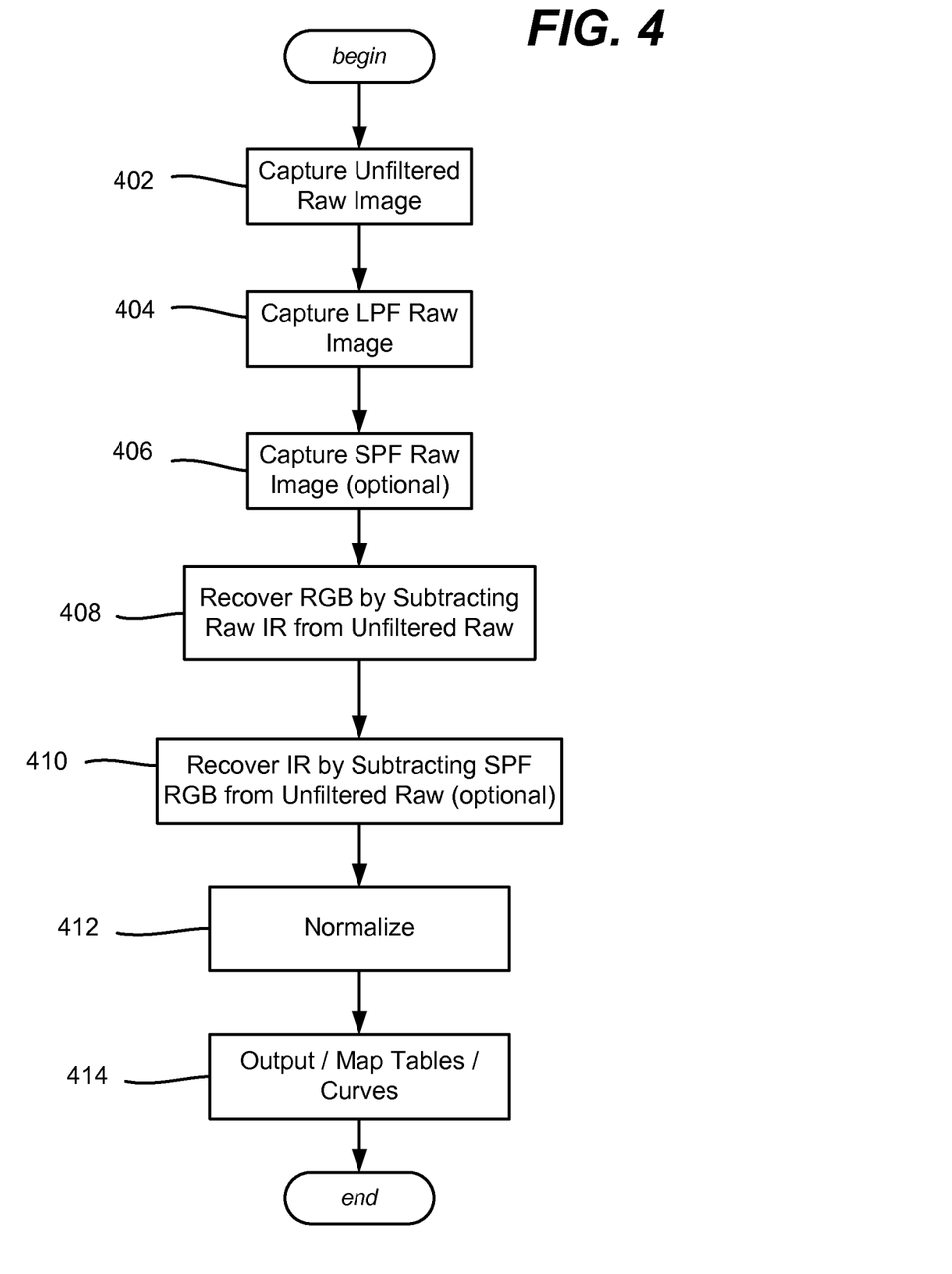
FIG. 4 is a flow diagram representing example steps that may be taken as part of offline color correction calibration, according to one or more example implementations.
Figure 6:
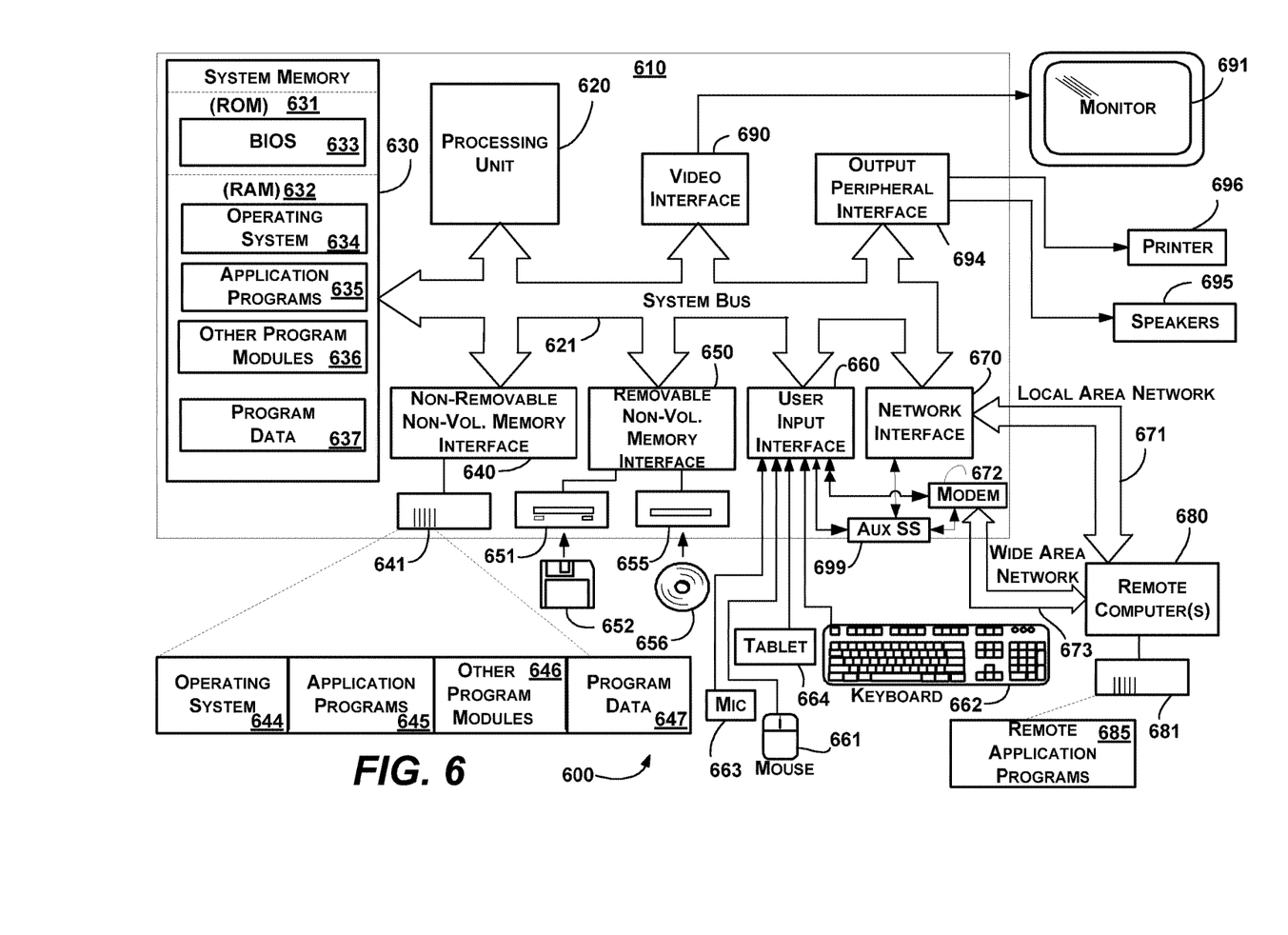
FIG. 6 is a block diagram representing an exemplary non-limiting computing system or operating environment, in the form of a gaming system, into which one or more aspects of various embodiments described herein can be implemented.

FIG. 6 illustrates an example of a suitable computing and networking environment 600 into which the examples and implementations of any of FIGS. 1A-5 may be implemented, for example, (particularly the calibration described in FIGS. 2-4). The computing system environment 600 is only one example of a suitable computing environment and is not intended to suggest any limitation as to the scope of use or functionality of the invention. Neither should the computing environment 600 be interpreted as having any dependency or requirement relating to any one or combination of components illustrated in the example operating environment 600.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 6, an example system for implementing various aspects of the invention may include a general purpose computing device in the form of a computer 610. Components of the computer 610 may include, but are not limited to, a processing unit 620, a system memory 630, and a system bus 621 that couples various system components including the system memory to the processing unit 620. The system bus 621 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 610 typically includes a variety of computer-readable media. Computer-readable media can be any available media that can be accessed by the computer 610 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, solid-state device memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 610. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 630 includes computer storage media in the form of volatile and/or nonvolatile memory such as read only memory (ROM) 631 and random access memory (RAM) 632. A basic input/output system 633 (BIOS), containing the basic routines that help to transfer information between elements within computer 610, such as during start-up, is typically stored in ROM 631. RAM 632 typically contains data and/or program modules that are immediately accessible to and/or presently being operated on by processing unit 620. By way of example, and not limitation, FIG. 6 illustrates operating system 634, application programs 635, other program modules 636 and program data 637.

The computer 610 may also include other removable/non-removable, volatile/nonvolatile computer storage media. By way of example only, FIG. 6 illustrates a hard disk drive 641 that reads from or writes to non-removable, nonvolatile magnetic media, a magnetic disk drive 651 that reads from or writes to a removable, nonvolatile magnetic disk 652, and an optical disk drive 655 that reads from or writes to a removable, nonvolatile optical disk 656 such as a CD ROM or other optical media. Other removable/non-removable, volatile/nonvolatile computer storage media that can be used in the example operating environment include, but are not limited to, magnetic tape cassettes, solid-state device memory cards, digital versatile disks, digital video tape, solid-state RAM, solid-state ROM, and the like. The hard disk drive 641 is typically connected to the system bus 621 through a non-removable memory interface such as interface 640, and magnetic disk drive 651 and optical disk drive 655 are typically connected to the system bus 621 by a removable memory interface, such as interface 650.

The drives and their associated computer storage media, described above and illustrated in FIG. 6, provide storage of computer-readable instructions, data structures, program modules and other data for the computer 610. In FIG. 6, for example, hard disk drive 641 is illustrated as storing operating system 644, application programs 645, other program modules 646 and program data 647. Note that these components can either be the same as or different from operating system 634, application programs 635, other program modules 636, and program data 637. Operating system 644, application programs 645, other program modules 646, and program data 647 are given different numbers herein to illustrate that, at a minimum, they are different copies. A user may enter commands and information into the computer 610 through input devices such as a tablet, or electronic digitizer, 664, a microphone 663, a keyboard 662 and pointing device 661, commonly referred to as mouse, trackball or touch pad. Other input devices not shown in FIG. 6 may include a joystick, game pad, satellite dish, scanner, or the like. These and other input devices are often connected to the processing unit 620 through a user input interface 660 that is coupled to the system bus, but may be connected by other interface and bus structures, such as a parallel port, game port or a universal serial bus (USB). A monitor 691 or other type of display device is also connected to the system bus 621 via an interface, such as a video interface 690. The monitor 691 may also be integrated with a touch-screen panel or the like. Note that the monitor and/or touch screen panel can be physically coupled to a housing in which the computing device 610 is incorporated, such as in a tablet-type personal computer. In addition, computers such as the computing device 610 may also include other peripheral output devices such as speakers 695 and printer 696, which may be connected through an output peripheral interface 694 or the like.

The computer 610 may operate in a networked environment using logical connections to one or more remote computers, such as a remote computer 680. The remote computer 680 may be a personal computer, a server, a router, a network PC, a peer device or other common network node, and typically includes many or all of the elements described above relative to the computer 610, although only a memory storage device 681 has been illustrated in FIG. 6. The logical connections depicted in FIG. 6 include one or more local area networks (LAN) 671 and one or more wide area networks (WAN) 673, but may also include other networks. Such networking environments are commonplace in offices, enterprise-wide computer networks, intranets and the Internet.

When used in a LAN networking environment, the computer 610 is connected to the LAN 671 through a network interface or adapter 670. When used in a WAN networking environment, the computer 610 typically includes a modem 672 or other means for establishing communications over the WAN 673, such as the Internet. The modem 672, which may be internal or external, may be connected to the system bus 621 via the user input interface 660 or other appropriate mechanism. A wireless networking component such as comprising an interface and antenna may be coupled through a suitable device such as an access point or peer computer to a WAN or LAN. In a networked environment, program modules depicted relative to the computer 610, or portions thereof, may be stored in the remote memory storage device. By way of example, and not limitation, FIG. 6 illustrates remote application programs 685 as residing on memory device 681. It may be appreciated that the network connections shown are examples and other means of establishing a communications link between the computers may be used.

An auxiliary subsystem 699 (e.g., for auxiliary display of content) may be connected via the user interface 660 to allow data such as program content, system status and event notifications to be provided to the user, even if the main portions of the computer system are in a low power state. The auxiliary subsystem 699 may be connected to the modem 672 and/or network interface 670 to allow communication between these systems while the main processing unit 620 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A method for calibrating a color correction transform for an image capture device, the method comprising:
   receiving a request to generate the color correction transform for the image capture device, the image capture device comprising a sensor comprised of a photosite including a red, green, blue, and infrared (IR) part;
   based on the request, capturing, via the image capture device, known color data as raw image data;
   capturing, via the image capture device through a long pass filter, the known color data as long-pass-filtered image data;
   subtracting the long-pass-filtered image data for one or more of the red, green, and blue parts of the photosite of the sensor from the raw image data for individual corresponding parts of the photosite to obtain true color data values for the photosite;
   using data corresponding to the true color data values to produce one or more tables or curves;
   capturing different sets of the raw image data and the long-pass-filtered image data under different lighting conditions;
   using the captured different sets of the raw image data and the long-pass-filtered image data to one or more tables or curves corresponding to the different lighting conditions used to capture the different sets of the raw image data and the long-pass filtered image data;
   identifying a lighting condition for an image being captured by the image capture device;
   matching a set of the one or more tables or curves to the identified lighting condition; and
   calibrating the image capture device based on the set of the one or more tables or curves matching the identified lighting condition.

2. The method of claim 1 further comprising:
   accessing data in the different sets of the one or more tables or curves to color correct an online-captured image captured by the image capture device.

3. The method of claim 2 wherein the different sets of the one or more tables or curves correspond to one or more three-by-three matrices.

4. The method of claim 2 wherein the different sets of the one or more tables or curves correspond to one or more three-by-four matrices.

5. The method of claim 1 wherein capturing the known color data comprises capturing an image of a color chart.

6. The method of claim 5 further comprising:
   illuminating the color chart with infrared light.

7. The method of claim 1 further comprising:
   normalizing the true color data values to provide the data corresponding to the true color data values.

8. The method of claim 7 further comprising:
   offline computing an affine matrix transform for performing true RGB correction.

9. The method of claim 1 further comprising:
   capturing, via the image capture device through a short pass filter, the known color data as short-pass-filtered image data; and
   subtracting the short-pass-filtered image data for the IR part of the photosite of the sensor from the raw image data for individual corresponding parts of the photosite to obtain true infrared data for the photosite.

10. The method of claim 9 further comprising:
    capturing different sets of the short-pass-filtered image data under the different lighting conditions; and
    using the different sets of the the raw image data, the long-pass-filtered image data, and the short-pass-filtered image data to produce the different sets of one or more tables or curves, the different sets corresponding to different lighting conditions.

11. The method of claim 9 further comprising:
    accessing data in the different sets of the one or more tables or curves to color correct an online-captured image captured by the image capture device, including:
    selecting a starting IR value as a current IR value;
    (a) using the current IR value to obtain predicted red, green, and blue values;
    (b) using the predicted red, green, and blue values to update the current IR value; and
    (c) returning to (a) for a number of iterations.

12. The method of claim 9 further comprising:
    accessing data in the different sets of the one or more tables or curves to color correct an online-captured image captured by the image capture device, including:
    selecting starting red, green, and blue values as current red, green, and blue values;
    (a) using the current red, green, and blue values to obtain a predicted IR value;

(b) using the predicted IR value to update the current red, green, and blue values; and
(c) returning to (a) for a number of iterations.

13. The method of claim 1, further comprising:
selecting a current infrared value;
accessing the different sets of the tables or curves to determine predicted red, green and blue values based upon the current infrared value;
accessing the different sets of the tables or curves to determine a predicted infrared value based upon the predicted red, green and blue values;
setting the current infrared value as the predicted infrared value;
determining a stopping criterion is met; and
outputting an infrared value and red, green and blue values based upon the current infrared value and last predicted red, green and blue values.

14. A system comprising:
an image capture device comprising a sensor comprising a plurality of photosites, an individual photosite from the plurality of photosites having infrared, red, green, and blue parts;
and one or more processors programmed to:
receive a request to generate a color correction transform for the image capture device;
based on the request, capture, via the image capture device, known color data as raw image data;
capture, via the image capture device through a long pass filter, the known color data as long-pass-filtered image data;
subtract the long-pass-filtered image data for one or more of the red, green, and blue parts of the photosite of the sensor from the raw image data for individual corresponding parts of the photosite to obtain true color data values for the photosite;
use data corresponding to the true color data values to produce one or more tables or curves;
capture different sets of the raw image data and the long-pass-filtered image data under different lighting conditions;
use the captured different sets of the raw image data and the long-pass-filtered image data to produce different sets of the one or more tables or curves, the different sets of the one or more tables or curves corresponding to the different lighting conditions used to capture the different sets of the raw image data and the long-pass filtered image data;
identify a lighting condition for an image being captured by the image capture device;
match a set of the one or more tables or curves to the identified lighting condition; and
calibrate the image capture device based on the set of the one or more tables or curves matching the identified lighting condition.

15. The system of claim 14 wherein the one or more processors are further programmed to:
capture, via the image capture device through a short pass filter, the known color data as short-pass-filtered image data; and
subtract the short-pass-filtered image data for the IR part of the photosite of the sensor from the raw image data for individual corresponding parts of the photosite to obtain true infrared data for the photosite.

16. The system of claim 14 wherein the one or more processors are further programmed to:
select a current infrared value;
access the different sets of the tables or curves to determine predicted red, green and blue values based upon the current infrared value;
access the different sets of the tables or curves to determine a predicted infrared value based upon the predicted red, green and blue values;
set the current infrared value as the predicted infrared value;
determine a stopping criterion is met; and
output an infrared value and red, green and blue values based upon the current infrared value and last predicted red, green and blue values.

17. The system of claim 14 further comprising:
a camera configured to store the one or more tables or curves.

18. One or more computer storage devices having executable instructions, which on execution by a computer cause the computer to perform operations, comprising:
receiving a request to generate a color correction transform for an image capture device, the image capture device comprising a sensor comprised of a photosite including a red, green, blue, and infrared (IR) part;
based on the request, capturing, known color data as raw image data;
capturing, through a long pass filter, the known color data as long-pass-filtered image data;
subtracting the long-pass-filtered image data for one or more of the red, green, and blue parts of the photosite of the sensor from the raw image data for individual corresponding parts of the photosite to obtain true color data values for the photosite;
using data corresponding to the true color data values to produce one or more tables or curves;
capturing different sets of the raw image data and the long-pass-filtered image data under different lighting conditions;
using the captured different sets of the raw image data and the long-pass-filtered image data to produce different sets of the one or more tables or curves, the different sets of the one or more tables or curves corresponding to the different lighting conditions used to capture the different sets of the raw image data and the long-pass filtered image data;
identifying a lighting condition for an image being captured by the image capture device;
matching a set of the one or more tables or curves to the identified lighting condition; and
calibrating the image capture device based on the set of the one or more tables or curves matching the identified lighting condition.

19. The one or more computer storage devices of claim 18 having further computer-executable instructions comprising:
capturing through a short pass filter, the known color data as short-pass-filtered image data; and
subtract the short-pass-filtered image data for the IR part of the photosite of the sensor from the raw image data for individual corresponding parts of the photosite to obtain true infrared data for the photosite.

20. The one or more computer storage devices of claim 18 having further computer-executable instructions comprising:
selecting a current infrared value;
accessing the different sets of the tables or curves to determine predicted red, green and blue values based upon the current infrared value;

accessing the different sets of the tables or curves to determine a predicted infrared value based upon the predicted red, green and blue values;

setting the current infrared value as the predicted infrared value;

determining a stopping criterion is met; and outputting an infrared value and red, green and blue values based upon the current infrared value and last predicted red, green and blue values.

* * * * *